United States Patent Office 3,714,052
Patented Jan. 30, 1973

3,714,052
CHLORINATED HYDROCARBONS STABILIZED WITH ALKOXYALDEHYDE HYDRAZONE AND GLYCIDOL
Norman L. Beckers, Chardon, Ohio, assignor to Diamond Shamrock Corporation, Cleveland, Ohio
No Drawing. Continuation-in-part of applications Ser. No. 43,214, June 30, 1970, now abandoned, and Ser. No. 54,567, July 13, 1970, both continuations-in-part of abandoned application Ser. No. 794,410, Jan. 27, 1969. This application Aug. 2, 1971, Ser. No. 168,468
Int. Cl. C09d 9/00; C01ld 7/50; C23g 5/02
U.S. Cl. 252—171
4 Claims

ABSTRACT OF THE DISCLOSURE

A combination of an alkoxyaldehyde hydrazone and glycidol is used to stabilize chlorinated aliphatic hydrocarbon solvents.

REFERENCE TO A CO-PENDING APPLICATION

This application is a continuation-in-part of my co-pending U.S. Ser. Nos. 43,214 now abandoned and 54,567, both of which are continuations-in-part of Ser. No. 794,410, now abandoned.

BACKGROUND OF THE INVENTION

Among the most widely used industrial solvents are the chlorinated hydrocarbons, especially perchloroethylene, trichloroethylene and methychloroform. These solvents, particularly trichloroethylene and perchloroethylene, are widely used as degreasing solvents, most often as vapor phase degreasing solvents wherein the articles to be cleaned are suspended above the surface of the solvent which is then heated, the cleaning operation being effected by the action of the condensing vapors on the suspended articles. It is also widely known, however, that, during storage and particularly in use in vapor degreasing applications, the chlorinated hydrocarbons tend to decompose under the influence of oxygen, heat, light, metal salts, etc. Obviously this decomposition is undesirable in that it detracts from the operation of the solvent and limits its useful life. Furthermore the products of the decomposition of the solvent often attack the material, usually metal, thereby having both an adverse effect upon the metal article and adding to the contamination of the solvent.

As described in my co-pending application Ser. No. 54,567 and the parent application thereof, Ser. No. 794,410, now abandoned, a new class of nitrogen-containing compounds, i.e., alkoxyaldehyde hydrazones, has been found which is particularly effective for use as stabilizers which act to prevent the aforesaid decomposition from occurring to any substantial extent. It was further stated that in general the effectiveness of these hydrazones could be enhanced by their use in combination with certain other organic compounds. It is to one such combination found to be surprisingly effective, especially in preventing the stabilized solvent from attacking steel, that the present invention is directed.

STATEMENT OF THE INVENTION

Therefore it is an object of the present invention to provide a stabilized chlorinated aliphatic hydrocarbon solvent.

This and further objects of the present invention will become apparent to those skilled in the art from the specification and claims which follow.

It has now been found that the effectiveness of alkoxyaldehyde hydrazones in stabilizing chlorinated aliphatic hydrocarbon solvents, particularly perchloroethylene and trichloroethylene, is remarkably enhanced, particularly with regard to reducing the attack by the stabilized solvent system on steel, if glycidol is also present in the system. Of the organic epoxides tried, glycidol appears to be singularly effective.

DESCRIPTION OF THE PREFERRED EMBODIMENTS

Throughout the specification and claims the term "chlorinated hydrocarbon solvents" is intended to refer to the lower aliphatic ($C_1$–$C_2$) saturated and unsaturated chlorinated hydrocarbons such as perchloroethylene, trichloroethylene, methylchloroform, chloroform, methylene chloride, carbon tetrachloride, dichloroethylene, trichloroethane, vinylidene chloride, and the like. Because of their wide-spread industrial use, especially in those applications wherein decomposition of the chlorinated hydrocarbon solvent is a particular problem, reference will most otfen hereinafter be made to, and the preferred embodiments include, the chlorinated solvents selected from the group consisting of perchloroethylene, trichloroethylene and methylchloroform, especially perchloroethylene and trichloroethylene.

According to the practice of the invention, the alkoxyaldehyde hydrazones useful for stabilizing the chlorinated hydrocarbon solvents have the general formula:

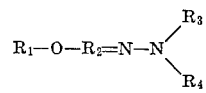

wherein $R_1$ and $R_2$ are members selected from the group consisting of saturated and unsaturated non-substituted aliphatic groups of from 1–3 carbon atoms and wherein $R_3$ and $R_4$ are members selected from the group consisting of hydrogen and saturated and unsaturated non-substituted aliphatic groups of from 1–3 carbon atoms. Illustrative of compounds defined by the above formula are methoxyacetaldehyde dimethylhydrazone, methoxypropionaldehyde dimethylhydrazone, ethoxyformaldehyde methylethylhydrazone, propoxyacetaldehyde methylhydrazone and the like. Particularly preferred at this time is methoxyacetaldehyde dimethylhydrazone. Such compounds are readily prepared by the condensation reaction of approximately equimolar quantities of an alkoxyaldehyde and a hydrazone. For example, methoxyacetaldehyde reacts with dimethylhydrazine in the following manner:

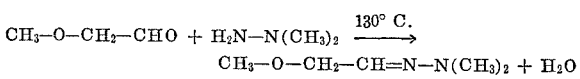

the product, methoxyacetaldehyde dimethylhydrazone, being one of the preferred compounds of the present invention. Conveniently the reaction can be carried out in a chlorinated hydrocarbon solvent which serves as an inert reaction medium from which water separates, driving the reaction to completion. Ideally, if the product is to be used to stabilize a chlorinated hydrocarbon solvent, the same solvent can be used as the reaction medium, thereby eliminating the need for its removal prior to use.

The quantity of the alkoxyaldehyde hydrazone useful in the practice of the present invention will of course vary depending upon the conditions of use, the identity and quantity of other stabilizers incorporated in the chlorinated solvent and other practical considerations and, hence, is generally referred to merely as "a stabilizing amount." However, it may generally be said that concentrations within the range of from 0.001–2.0 percent, and preferably from 0.01–0.5 percent, by weight on a chlorinated solvent basis, may be used. Higher concentrations may be used without detrimental effect, but are usually uneconomic.

The quantity of glycidol useful in the practice of the present invention will likewise vary and is again generally a "stabilizing amount." Usually, amounts within the range of from 0.001–1.0 percent, preferably 0.005–0.1 percent, are useful.

As was pointed out in the aforesaid co-pending applications, the types and causes of decomposition to which the chlorinated solvents are susceptible are numerous and therefore it will in most instances be desirable to incorporate, in addition to the alkoxyaldehyde hydrazone and glycidol, various amounts of other stabilizers which either provide a different stabilizing effect or serve to reinforce the action of the hydrazone-glycidol combination.

One class of such compounds which may advantageously be incorporated are the various amine materials, both aliphatic and aromatic, such as diethylamine, triethylamine, dipropylamine, diisopropylamine, diethanolamine, morpholine, N-methylmorpholine, pyridine and aniline. Other nitrogen-containing materials such as pyrroles, e.g., methylpyrrole and certain nitroalkanes such as nitromethane and nitropropane are also useful.

Further, other organic oxygen-containing compounds are often useful. For example, the organic epoxides such as ethylene oxide, 1,2-propylene oxide, 1,2-butylene oxide, epichlorohydrin cyclohexene oxide and the like may be used to reinforce the effect of the glycidol. Also useful are certain cyclic ethers such as tetrahydropyran, 1,4-dioxane, dioxolane, trioxane and tetrahydrofuran.

Another useful class of additives are those aromatic compounds containing a phenol group such as phenol itself, thymol, catechol, isoeugenol and other organic phenols having a low boiling point.

Also useful are a number of miscellaneous organic compounds such as esters, e.g., ethyl acetate; alcohols, e.g., amyl alcohol and methyl butynol, and ketones, e.g., methyl ethyl ketone.

In order that those skilled in the art may more readily understand the present invention and certain specific embodiments by which it may be carried into effect, the following illustrative examples are afforded.

Example 1

To illustrate the singular effectiveness of glycidol acting in combination with an alkoxyaldehyde hydrazone, three samples of perchloroethylene are stabilized as shown in the table. The letters MADH are used to represent methoxyacetaldehyde dimethylhydrazone, GLD represents glycidol and EPH represents epichlorohydrin. The method of evaluation is referred to as the "72 hour stability test" and comprises placing 100 milliliters of the stabilized solvent system in question into a flask fitted with a Soxhlet extractor and condenser together with 0.2 milliliters of distilled water. Three strips of 0.003 gauge steel, 2.0 x 7.5 centimeters in size, are located as follows; first strip directly in the solvent in the flask, second strip in the Soxhlet extractor, third strip in the lower end of the condenser. A 100 watt incandescent light bulb is located one inch from the vapor tube of each Soxhlet extractor. Heat is then applied at a rate sufficient to cause the extractor to siphon every 8–10 minutes. Refluxing is continued for 72 hours, at which time the light and heat are turned off and the sample is allowed to cool. The steel strips are then removed, cleaned of corrosion and weighed and, by comparison with the pre-testing weight, the loss due to the corrosive effect of the solvent on the steel is obtained. Obviously this weight loss is a reflection of both the corrosive effect of the stabilized solvent and the extent of decomposition of the solvent. Further, the solvent after the test, as well as a portion of the stabilized solvent prior to the test, is extracted with an equal amount of distilled water and the pH is measured. The results are as shown in the table.

TABLE

| P.p.m. | | | pH | | Fe loss (mg.) |
|---|---|---|---|---|---|
| MADH | GLD | EPH | Before | After | |
| 300 | | | 7.1 | 2.0 | 274 |
| 300 | | 300 | 7.1 | 4.4 | 174 |
| 300 | 300 | | 7.1 | 6.5 | 73 |

From the foregoing table it will readily be seen that the combination of an alkoxyaldehyde hydrazone and glycidol is remarkably effective in reducing the corrosive effect of a chlorinated solvent on steel.

Example 2

As a further illustration of the effectiveness of the combination of the present invention, a sample of perchloroethylene is stabilized with 300 p.p.m. of MADH, 300 p.p.m. GLD and 40 p.p.m. N-methylmorpholine (NMM). By the same method of evaluation as in Example 1, an initial pH of 8.0, a final pH of 7.4 and an iron weight loss of only 45 mg. are observed. By way of contrast, an identical sample, with the exception that the GLD is replaced with a like amount of EPH, shows an initial pH of 8.1, a final pH of 5.0 and a weight loss of 200 mg. This clearly illustrates that, not only is the combination of this invention remarkably effective, but also that it is compatible with other stabilizing ingredients, a fact apparently not true of the more commonly used EPH.

Example 3

A sample of perchloroethylene is stabilized with 40 p.p.m. NMM, 40 p.p.m. thymol, 120 p.p.m. MADH and 300 p.p.m. GLD. After the test of Example 1, the final pH of the solvent, which is colorless, is 7.5 and an iron weight loss of only 21 mg. is noted. Substituting 1000 p.p.m. EPH for the GLD, a solvent having a yellow color and a pH of 7.9 and an iron weight loss of 59 mg. are noted.

While the invention has been described with reference to certain specific embodiments thereof, it is not to be so limited since changes and alterations may be made which are still within the intended scope of the appended claims.

I claim:

1. A chlorinated aliphatic hydrocarbon solvent stabilized with;
   (a) from 0.001–2.0 percent by weight of an alkoxyaldehyde hydrazone having the formula

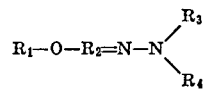

wherein $R_1$ and $R_2$ are members selected from the group consisting of saturated and unsaturated non-substituted aliphatic groups of from 1–3 carbon atoms and $R_3$ and $R_4$ are members selected from the group consisting of hydrogen and saturated and unsaturated non-substituted aliphatic groups of from 1–3 carbon atoms and
   (b) from 0.001–1.0 percent of glycidol.

2. A stabilized solvent as in claim 1 wherein the solvent is perchloroethylene.

3. A stabilized solvent as in claim 1 wherein the hydrazone is methoxyacetaldehyde dimethyl hydrazone.

4. A method of degreasing steel which method consists essentially of exposing steel to the vapors of a chlorinated aliphatic hydrocarbon solvent stabilized with:

(a) from 0.001–2.0 percent by weight of an alkoxyaldehyde hydrazone having the formula

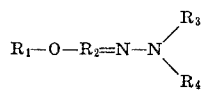

wherein $R_1$ and $R_2$ are members selected from the group consisting of saturated and unsaturated non-substituted aliphatic groups of from 1–3 carbon atoms and $R_3$ and $R_4$ are members selected from the group consisting of hydrogen and saturated and unsaturated non-substituted aliphatic groups of from 1–3 carbon atoms and, (b) from 0.001–1.0 percent of glycidol.

References Cited
UNITED STATES PATENTS

| | | | |
|---|---|---|---|
| 3,043,888 | 7/1962 | Pray et al. | 260—652.5 |
| 3,152,191 | 10/1964 | Cormany et al. | 260—652.5 |
| 3,499,047 | 3/1970 | Cormany et al. | 252—172 |
| 3,505,415 | 4/1970 | Richtzenhain et al. | 260—652.5 |

LEON D. ROSDOL, Primary Examiner

W. E. SCHULZ, Assistant Examiner

U.S. Cl. X.R.

260—652.5